United States Patent Office.

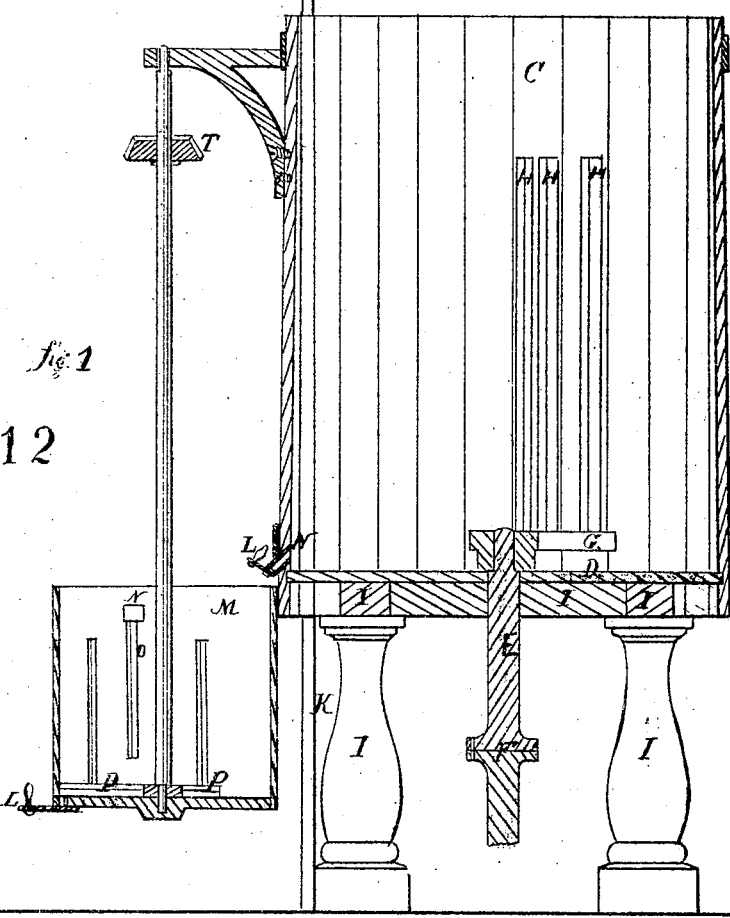
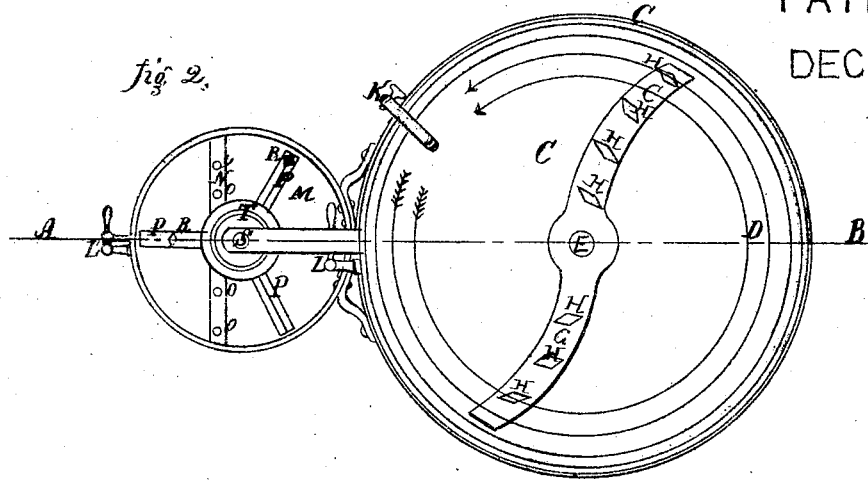

JOHN HASLETT, JR., OF ALLEGHENY CITY, PENNSYLVANIA, ASSIGNOR TO HIMSELF, GEORGE W. FAHNESTOCK, AND J. L. SCHWARTZ.

Letters Patent No. 71,612, dated December 3, 1867.

IMPROVED MACHINE FOR MIXING AND FEEDING WHITE LEAD.

The Schedule referred to in these Letters Patent and making part of the same.

TO ALL WHOM IT MAY CONCERN:

Be it known that I, JOHN HASLETT, Jr., of the city of Allegheny, in the county of Allegheny, and State of Pennsylvania, have invented a new and useful machine for mixing the carbonate of lead with water or oil, and for feeding the same to the stones by which it is ground at a uniform rate, and called a White-Lead Mixer and Feeder Combined; and I do hereby declare that the following is a full, clear, and exact description of the same, reference being had to the annexed drawings, making part of this specification, and to the letters of reference marked thereon, in which—

Figure 1 is a vertical central section of my machine through the section line A B of fig. 2, and
Figure 2 is a top view of the same.

The nature of my invention consists in constructing a machine which, being driven by steam or other power, thoroughly incorporates the carbonate of lead with water, when the same is to be ground with water, or with oil when ground with oil; and in combining with this mixer a machine, also driven by machinery, for delivering the mixed water and lead, or oil and lead, to the stones, by which it is ground at a uniform rate; the whole machine being so constructed and arranged as to supersede the present laborious and unsatisfactory process of mixing the carbonate of lead with water or oil by hand, and of feeding the mixture to the stones in the same manner, i. e., by hand, which requires the constant attention of one or more persons.

To enable those skilled in the art to make and use my invention, I will proceed to describe its construction and operation.

C, figs. 1 and 2, is a tank; D, the bottom of the same; E, upright shaft; F, coupling of the same; G G, curved arms; H H H, &c., perpendicular blades or arms; I I I I, frame; K, water-pipe; L L', gauge-cocks; V, discharge-pipe; M, feeder; N, bar, to which the stationary blades are attached; O O' O'' O''', stationary blades; P P P, arms, to which the revolving blades of the feeder are attached; R R R, revolving blades; S, shaft; T, bevel-gear wheel; V, bracket for the support of the shaft S.

My machine may be constructed of any suitable material which will resist the action of the acid which is mixed with the carbonate of lead. For all those parts of my machine which require to be built of metal, and which are likely to come in contact with the carbonate of lead, I use brass, as being the least affected by the acid contained in the carbonate of lead. The tank C is built of wood, of any desired capacity, and a discharge-pipe, V, with the gauge-cock L, both of which are of brass. The bottom D is also of brass. Through this bottom the shaft E passes, carrying the curved arms G G. To these arms the upright blades H H, &c., are attached. These blades are so arranged that those on one arm do not follow in the path of those on the other, but cut one of their own through the mass to be stirred, as shown by the red arrows in fig. 2.

The shaft E is revolved by the power applied through the shaft which is attached at F, fig. 1. Water is admitted through the pipe K. The tank is supported on the frame I I, &c. The feeder is placed under the discharge-pipe V. I make this feeder entirely of brass, and of convenient size. The blades O O' O'' O''' are stationary, and reach almost to the bottom of the feeder. They are secured to the cross-bar N, and are placed in this position to prevent the contents of the feeder from assuming a rotary motion. The arms P P P are attached to the shaft S, and are driven by it. Each carries a perpendicular blade so placed as to pass between the blades O O O O. The under sides of these arms revolve close to the bottom of the feeder, and force the mixture through the hole in the bottom closed by the gauged cock L'', from which it falls into the stones, where it is ground. The shaft S rests on a pivot in the bottom of the feeder, and is supported by the bracket V at its upper end, or in a journal-box fastened to some part of the building in which the machine may be set up. The feeder is driven by the power which is applied through the gear-wheel T. Two or more of these feeders may be attached to the same mixer, which is placed between the stones in such a position as to bring the feeders in the proper position over the stones.

Operation.

After the carbonate of lead is separated from the uncorroded lead mixed with it on being taken from the corroding-bed, it is thrown into the mixer, and sufficient water added to it from the water-pipe. The revolutions of the arms carrying the blades H H, &c., mix the carbonate of lead and the water thoroughly together, reducing them to a homogeneous mass. When sufficiently mixed, the mass is drawn off into the feeder as required, fresh carbonate of lead and water being added from time to time to that in the mixer. The gauge-cock L in the feeder being correctly set, the feeder needs no further attention than to see that it is supplied from the mixer when necessary, but delivers the carbonate of lead to the stone at a uniform rate, which could not be attained when the same work was done by hand. The working of the machine when mixing the carbonate of lead with oil is substantially the same.

Claim.

Not confining myself to any special material for constructing the same, what I claim as my invention in white-lead mixing and feeding, and desire to secure by Letters Patent of the United States, is—

1. The mixer, consisting of the tank C, the water-pipe K, the discharge-pipe V, with its gauged cock L; the revolving arms G G, having the perpendicular blades H H H H H, &c., and the shaft E, all constructed substantially as and for the purpose set forth; and 2. Combining with the mixer the feeder, having the revolving arms P P P and blades R R R, shaft S, the stationary blades O O O O, and the gauge-cock L', constructed and operating substantially as and for the purpose set forth.

JOHN HASLETT, Jr. [L. S.]

Witnesses:
    FRANCIS L. CLARK,
    FRANK M. HASLETT.